Dec. 10, 1963     C. E. HEMMINGER     3,113,844
HALIDE CATALYTIC CRACKING
Filed May 6, 1960
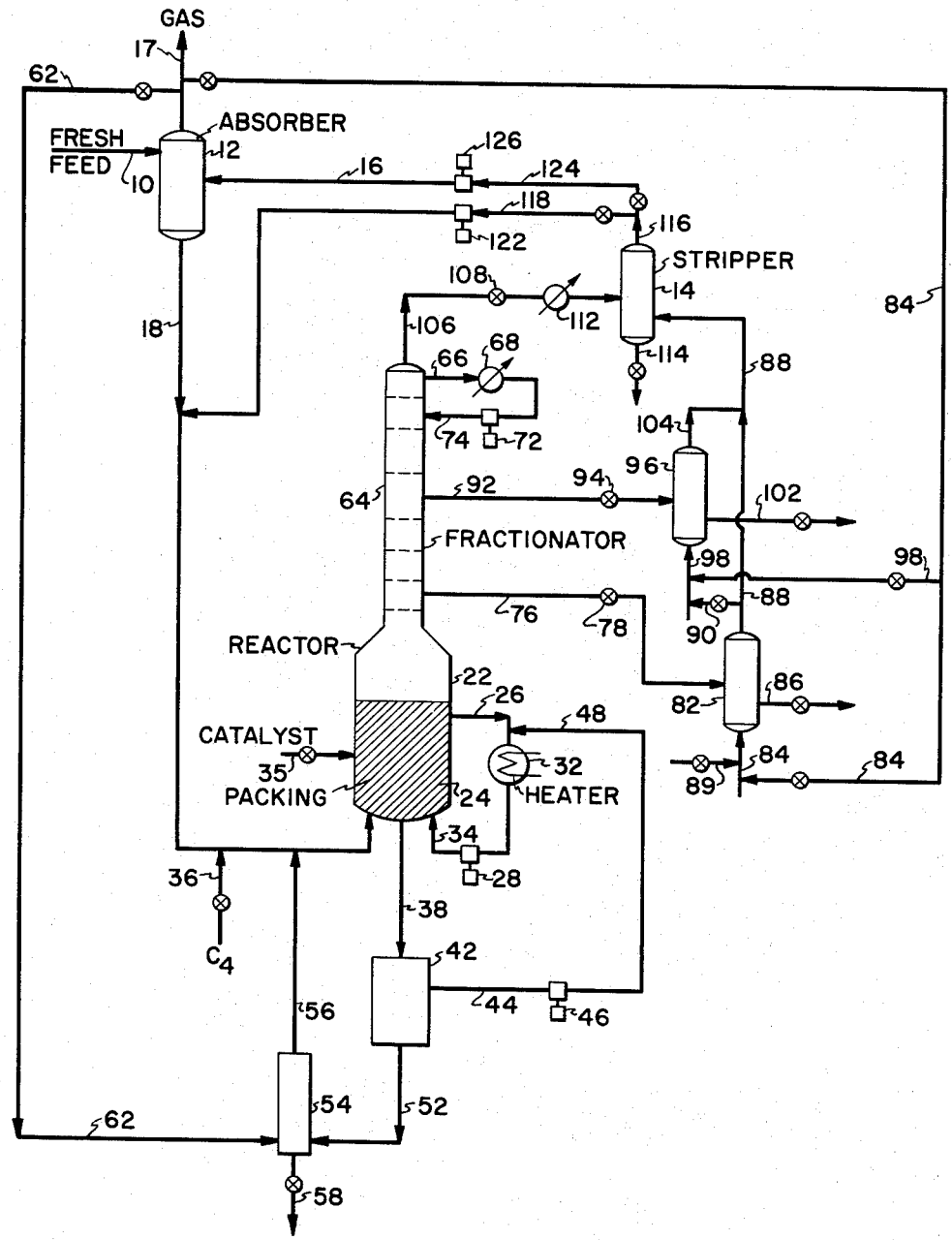
Charles E. Hemminger Inventor
By *George Shilley*
Patent Attorney 3,113,844
HALIDE CATALYTIC CRACKING
Charles E. Hemminger, Westfield, N.J., assignor to Esso Research and Engineering Company, a corporation of Delaware
Filed May 6, 1960, Ser. No. 27,387
3 Claims. (Cl. 23—288)

This invention relates to the catalytic conversion of hydrocarbons using a homogeneous normally gaseous halide catalyst. More particularly the invention relates to the use of liquid hydrofluoric acid, hydrofluoric acid-boron trifluoride mixture, or the like, for cracking heavy oils such as gas oils and residual oils to produce gasoline. With the halide catalysts, coke or carbonaceous solids are not formed or deposited on the catalyst as where solid catalysts are used but tar or heavy fuel oil are produced. The tar or heavy fuel oil comprises high boiling hydrocarbon conversion products. The tar functions to increase the activity of the catalyst and according to the present invention a high tar concentration is maintained in the reactor.

Using the halide catalysts results in a relatively small amount of fixed gases such as hydrogen, methane, ethane and propane. The light hydrocarbons as butanes and pentanes which are formed are isoparaffinic and these are useful for recycling in the system and also are useful as such in other processes or as components of the gasoline product. The hydrogen fluoride or hydrofluoric acid is used, in substantially anhydrous liquid form. The catalyst may also comprise an HF—$BF_3$ system. Preferably, at least some isobutane which is produced in the process or supplied from external sources is recycled to the reactor. When using $BF_3$ as part of the catalyst up to 50% by weight of $BF_3$ may be used and this amount can be between about 5 and 50% by weight. The present invention is also useful with other normally gaseous halide catalysts such as hydrochloric acid or a mixture of hydrochloric acid and boron trichloride.

In the drawing the FIGURE represents a diagrammatic showing of an apparatus useful for practicing the present invention.

Referring now to the drawing, the reference character 10 designates a line for the introduction of the fresh oil feed, such as light or heavy gas oil, residual petroleum oil and the like into the top or upper portion of a scrubber and absorber tower 12. At least part of the overhead gas from stripper tower 14, later to be described, is introduced into an intermediate portion of tower 12 through line 16. This gas contains gaseous hydrocarbons and hydrogen fluoride gas, and boron trifluoride, if used, and as the gas flows upwardly through absorber or scrubber tower 12, it contacts the downflowing oil feed and the oil feed absorbs the volatile halide catalyst including hydrogen fluoride, boron trifluoride, etc., and light hydrocarbons as butane, pentane, etc., in the gas. The unabsorbed gas contains hydrogen, methane, ethane, etc., and passes overhead through line 17. The absorber tower 12 functions as a volatile halide recovery tower. The fresh oil feed with the absorbed halide catalyst such as hydrogen fluoride passes from the bottom of the tower 12 through line 18 into the bottom of reaction tower 22. Line 18 introduces the oil feed into the bottom portion of reactor 22.

The oil feed is preferably preheated to about 150° F. to 500° F. before being introduced into reactor 22. The gas introduced into absorber tower 12 is at a temperature between about 50° F. and 100° F. The concentration of the hydrogen fluoride in the fresh oil feed in absorber tower 12 is between about 0.1 and 0.5 lb. of HF per lb. of gas oil feed.

The lower portion of reaction tower 22 is provided with packing as shown at 24 to aid in mixing the catalyst and oil. The packing may be a conventional packing such as Raschig rings, refractory spheres and the like. The temperature in the reaction tower or zone is between about 150° F. and 450° F. Most of the reaction takes place in the lower portion of the reaction tower 22. Heat of cracking is supplied by a reboiler stream which is withdrawn from an intermediate portion of the reaction tower 22 through line 26 and passed by pump 28 through heater or furnace 32 and returned through line 34 into the bottom portion of reaction tower 22. Catalyst for the reaction is introduced into the bottom portion of the reaction tower 22 through line 35. The reaction tower 22 is maintained under a pressure between about 400 lbs./in.$^2$ and 1500 lbs./in.$^2$. Butane or iso-butane from an extraneous source may be added to line 18 through valved line 36 for admixture with the oil feed passing to the reaction tower 22.

The liquid high boiling bottoms or tar fraction has a boiling point above about 1100° F. and is withdrawn from the bottom of the reaction tower 22 through line 38 and passed to settling tower 42 to permit separation of the bottoms into roughly two phases. The top phase which is paraffinic, has a low concentration of fluoride catalyst and is substantially nonasphaltenic, is returned to the reaction tower 22 by being withdrawn through line 44 and passed by pump 46 through line 48 into the recycle bottoms heating line 26, preferably upstream of heater 32. The heavier tar phase contains complex ring compounds of fluorides and asphaltenes and is withdrawn from the bottom of the settling tower 42 through line 52 and passed to stripping tower 54. In stripping tower 54 the heavy tar phase is stripped of gaseous catalyst including hydrogen fluoride and the stripped-out catalyst including hydrogen fluoride and stripping gas are passed overhead through line 56 and into line 18 for recycle to the bottom of reaction tower 22.

Tar bottoms are withdrawn through line 58 from the bottom of stripping tower 54 and discarded. Stripping gas is withdrawn from overhead gas line 17 and passed through line 62 into the bottom portion of the stripping tower 54 to strip out the gaseous catalyst including hydrogen fluoride from the heavy bottoms phase in the stripping tower 54. The gas used for stripping in line 62 is part of the gas passing overhead through line 17 from the absorber 12.

During the cracking operation lighter hydrocarbons are formed and these more volatile cracked products pass up from the reaction tower or chamber 22 to the upper narrower part 64 of the tower 22 which is in the form of a fractionating tower. The volatile catalyst passes along with the cracked products up the tower. Some additional cracking of the liquid takes place on the plates of the fractionating section 64 which is beneficial.

The upper fractionating section 64 of the tower 22 can be of conventional design. At the upper part of the fractionating section 64, reflux line 66 having a cooler 68 is provided for withdrawing and cooling liquid from the upper portion of the fractionating section 64 and for returning the cooled liquid by pump 72 through line 74 at a region below the region of withdrawal of the reflux liquid. The reaction chamber 22 and fractionating section 64 form a vertically arranged elongated vessel.

The desired product cuts or fractions are taken as side streams from the fractionator section 64. The lowest line 76 withdraws higher boiling hydrocarbons from the lowest section in the fractionating section 64 and the hydrocarbons are passed through pressure reducing valve 78 to stripper fractionator 82 where the pressure is between about 50 and 200 lbs./in.$^2$. Another portion of the gas withdrawn from overhead line 17 from scrubber tower 12 is passed through line 84 into the bottom portion of the stripper fractionator 82 as stripping gas to remove volatile hydrogen fluoride catalyst and normally gaseous hydrocarbons such as butane and isobutane. The heavy hydrocarbon fraction is withdrawn from the lower portion of the stripper tower 82 through line 86 and comprises a hydrocarbon fraction substantially free from hydrogen fluoride and having a boiling range between about 600° F. and 900° F. The gaseous products including gaseous hydrogen fluoride pass overhead through line 88 and are introduced into the lower portion of the stripper tower 14 to act as stripping gas therein. Instead of introducing gaseous hydrocarbons such as butane and isobutane through line 36 into line 62, it is preferred to introduce hydrocarbon gas such as butane and isobutane from an extraneous source through lines 89 and 84 into the bottom of stripping tower 82 for reuse in stripping tower 14. Overhead gas from stripping tower 82 passing through line 88 may be passed in part at least through line 90 passing to stripping tower 96 presently to be described for reuse therein.

A lighter fraction is withdrawn further up from the fractionating section 64 through line 92 having a pressure reducing valve 94 into a stripper tower 96 where the pressure is between about 50 and 200 lbs./in.² A portion of the gas from overhead line 17 is withdrawn through line 84 and passed through line 98 into the bottom portion of the stripper tower 96 to remove normally gaseous hydrocarbons and volatile hydrogen fluoride catalyst from the normally liquid hydrocarbons. Extraneous stripping gas may be introduced into line 98 for passage through stripping tower 96. An intermediate boiling hydrocarbon fraction is withdrawn from the bottom portion of the stripper tower 96 through line 102 and is substantially free of hydrogen fluoride and has a boiling point between about 400° F. and 600° F. Unabsorbed gaseous material including gaseous hydrogen fluoride passes overhead from stripper tower 96 through line 104 and is introduced into the bottom portion of stripper 14 through line 88 together with the overhead from stripper fractionator 82.

By providing the plurality of stripping towers 14, 82 and 96, re-use of the stripping gas is possible, as for example, line 88 takes the stripping gas from the top of stripping tower 82 to the bottom of stripping tower 14. An excellent stripping gas for towers 82, 96 and 14 comprises the butanes. Hydrogen is also a good stripping gas for the system.

The volatile or vaporous overhead product passes from the top of the fractionating section 64 through line 106 having a pressure reducing valve 108 and a cooler or condenser 112 to condense normally liquid hydrocarbons. The cooled overhead is passed into the stripper tower 14 where the pressure is between about 35 and 175 lbs./in.² and into which a stripping gas is introduced into the bottom portion of the stripping tower to remove normally gaseous hydrocarbons and hydrogen fluoride catalyst as a gas. As pointed out above the stripping gas introduced into the bottom portion of the stripping tower 14 is made up of gases passing overhead from stripping towers 82 and 96. A relatively light hydrocarbon fraction free of hydrogen fluoride is withdrawn from the bottom of the stripper tower 14 through line 114 and this fraction comprises the gasoline fraction having a boiling point between about 165° F. and 400° F.

The unabsorbed gases and gaseous catalyst pass overhead from the stripping tower 14 through line 116 and a portion of this gaseous overhead is compressed and passed through line 118 by compressor 122 to line 18 for recycle to the reaction zone or tower 22. The rest of the overhead gaseous material from stripper tower 14 is compressed and passed through line 124 by compressor 126 and through line 16 into the scrubber absorber tower 12 into which the fresh feed is introduced through line 10. The scrubber absorber tower 12 functions to have the fresh feed scrub out the hydrogen fluoride catalyst and also to absorb light paraffins including isoparaffins for recycle to the reaction tower 22.

Line 118 is used when there is a large volume of isobutane in the system and the isobutane and hydrogen fluoride are passed to line 18 and to reactor 22 and bypass the scrubber-absorber tower 12. Under these conditions flow through line 124 is only that necessary to purge the process of light gases.

In the present invention it will be apparent that there is a difference in contact time between the light and heavy products of the reaction. This is obtained by the vaporization of the light fractions as soon as they are formed. In the present invention most of the reaction takes place in the lower reaction tower 22 and volatile hydrocarbons boiling below about 700° F. to 1000° F. pass overhead to the fractionating section 64. Heavy ends resulting from the fractionation in section 64 are returned to the lower portion of reaction zone or tower 22 for further reaction.

An additional feature is the control of the degree of cracking by recycling the heavy gas oil fraction back into the reactor. The pressure in fractionator 64 and reactor 22 is controlled in relationship to the temperature in reactor 22 and the amount of reflux in line 74 along with the character of the feedstock and the end point of the heavy fraction removed in line 76 so that those hydrocarbons boiling above the end point of the heavy fraction in line 76, say boiling above 900° F., which are carried in the vapor stream leaving reactor 22 and entering the bottom of fractionator 64 are condensed in the bottom of fractionator 64 and return to the liquid in the bottom of reactor 22. Thus, secondary cracking is eliminated by allowing the more volatile fractions to escape from the reaction upwardly through fractionator 64 as formed. There will be, of course, some reactions catalyzed by the HF adsorbed in the liquids flowing down fractionator 64 which is compensated for by adjusting the reflux and temperature at the top of fractionator 64 by conventional techniques.

In this way the time of contact of the heavy gas oil fraction is increased over that of the light gas oil fraction and the gasoline. In addition, heavy hydrocarbons are withdrawn from the bottom of the reaction tower 22 through line 26 and passed through heater or furnace 32 and then recycled to the bottom of the reaction tower 22 for additional reaction.

In the present invention a high tar concentration is maintained in the reaction tower 22 and this increases the activity of the catalyst to produce more desirable products. Since the end point of the heavier fraction removed in line 76 is in the range of 700°–900° F., the principal purpose of the invention is to crack the higher boiling fractions in the feed to hydrocarbons boiling at lower temperatures. Any fraction of the feed boiling below 700°–900° F. are essentially distilled up through fractionator 64 and do not react in reactor 22. Experiments have shown that the HF with or without $BF_3$ promoters is a more active catalyst if the liquid HF contains or is complexed with 10 to 20% of tar as the product from the reaction. This tar may be defined as hydrocarbons boiling above 1100° F. For example, if 900°–1100° F. gas oil is passed through a tube with an equal weight of liquid HF at cracking conditions, the severity of cracking of the gas oil is at least doubled by having 10% of recycle tar present in the HF. At the same time the gas yield is decreased by the recycle tar for the same gasoline yield. Consequently, the rate of withdrawal of tar bottoms in line 58 and the rate of addition of catalyst through line 34 are coordinated with the fresh feed rate through line 10 so that the liquid phase reaction mixture in reactor 22 contains 0.5 to 4 lbs. HF per lb. of oil and 0.2 to 1 lb. tar per lb. of oil. By recycling tar or by having a high tar concentration in the reactor, a decreased tar yield is obtained in the main reaction.

Another feature of the invention is the recycle or circulating line 26 about the reactor 22 which removes liquid through line 26 and returns it to the reactor through line 34. As previously stated the heat of reaction as well as the heat of vaporization of the products are added to the circulating stream in heater 32. The use of pump 28 to give a high pressure drop, say 100 p.s.i., through heater 32, enables high velocity heat transfer which reduces the heat transfer surface and the contact time of the reactants at temperatures above the reaction temperature in vessel 22 as compared with a heating coil placed in vessel 22.

Another function of the circulating line is to provide intimate mixing in reactor 22. Separation of the heavy HF-tar complex and the lighter feed hydrocarbons is avoided and more intimate mixing of the two phases is obtained by pumping into reactor 22 and over the packing 24 about 0.5 to 2.0 vol. of oil per minute per volume in the reactor 22.

The following are typical results obtained with a 950° F.+ Middle East vacuum residua having a gravity of 7.8° API and Saybolt final viscosity of 540 seconds at 210° F. Isobutane equal to 0.1 lb. per lb. of feed is added to the system through line 36.

| | |
|---|---|
| Pressure, p.s.i.g. | 500 |
| Temperature, °F | 250 |
| Llbs./lb. of oil in reactor: | |
| HF | 1.5 |
| Tar | 0.3 |
| Vol. feed per vol. reactor per hour | 2.0 |
| Yields: | |
| $C_1$–$C_3$, wt. percent | 2 |
| $C_4$—400 vol. percent | 10 |
| 400–600 vol. percent | 25 |
| 600–900 vol. percent | 52 |
| Tar | 24 |

The $C_1$–$C_3$ fraction is 80 wt. percent propane, the $C_4$ fraction is 80% isobutane and the $C_5$ fraction 90% isopentane. The tar has a gravity in the order of −5 to 5° API.

What is claimed is:

1. An apparatus including in combination a vertically arranged elongated vessel provided with a contacting chamber in its lower portion and a fractionating tower in its upper portion, means for introducing a reactant and catalyst into said contacting chamber for contacting therein, means for withdrawing a liquid mixture from said contacting chamber and heating it and returning it to the bottom portion of said contacting zone to supply heat thereto and to form reaction vaporous products which pass up and are fractionated in said fractionating tower, pipes at different levels for withdrawing a plurality of liquid fractions from said fractionating tower, a stripping tower connected directly to each pipe, a pipe for each tower and communicating with the bottom of each stripping tower for introducing stripping gas into the bottom of the stripping towers to strip off catalyst from each withdrawn fraction, a scrubbing vessel, means for passing said stripped off catalyst to said scrubbing vessel and means for introducing an absorbent into said scrubbing vessel to absorb and recover said catalyst.

2. An apparatus including in combination a vertically arranged elongated vessel provided with a contacting chamber in its lower portion and a fractionating tower in its upper portion, means for introducing volatile catalyst and liquid feed into said contacting chamber for contacting therein, means for withdrawing a liquid mixture from said contacting chamber, a heater, means for passing said withdrawn liquid mixture through said heater and for returning said heated mixture to the bottom portion of said contacting zone to supply heat thereto and to form reaction vaporous products which pass up and are fractionated in said fractionating tower, pipes at different levels for withdrawing a plurality of fractions from said fractionating tower, a stripping tower connected to each pipe, a separate pipe for introducing stripping gas into the bottom of each stripping tower to strip out gaseous catalyst from each withdrawn fraction, a scrubbing vessel, means for passing stripped gaseous catalyst from said stripping vessels to said scrubbing vessel and means for introducing an absorbent into said scrubbing vessel to absorb and recover gaseous catalyst.

3. An apparatus according to claim 2 wherein said scrubbing vessel is provided with a top gaseous outlet line, and pipes are provided for connecting said top gaseous outlet line with the bottom of each of said stripping towers to supply said stripping gas thereto.

References Cited in the file of this patent

UNITED STATES PATENTS

| | | |
|---|---|---|
| 1,763,608 | Weaver | June 10, 1930 |
| 2,427,009 | Lien et al. | Sept. 9, 1947 |
| 2,495,133 | Ridgway | Jan. 17, 1950 |
| 2,518,546 | Hengstebeck | Aug. 15, 1950 |
| 2,592,740 | Ridgway | Apr. 15, 1952 |
| 2,600,671 | Miron | June 17, 1952 |
| 2,644,785 | Harding et al. | July 7, 1953 |
| 2,665,239 | Howard et al. | Jan. 5, 1954 |
| 2,670,320 | Kassel | Feb. 23, 1954 |
| 2,873,247 | Borey | Feb. 10, 1959 |
| 2,901,416 | Tate | Aug. 25, 1959 |
| 2,911,355 | Ernst | Nov. 3, 1959 |